May 27, 1941.　　　A. SCHOLTZ　　　2,243,395

GRAIN TANK FOR TRUCKS

Filed May 13, 1940　　　2 Sheets-Sheet 1

Anton Scholtz,
INVENTOR

BY Victor J. Evans & Co.
ATTORNEYS

May 27, 1941.   A. SCHOLTZ   2,243,395
GRAIN TANK FOR TRUCKS
Filed May 13, 1940   2 Sheets-Sheet 2
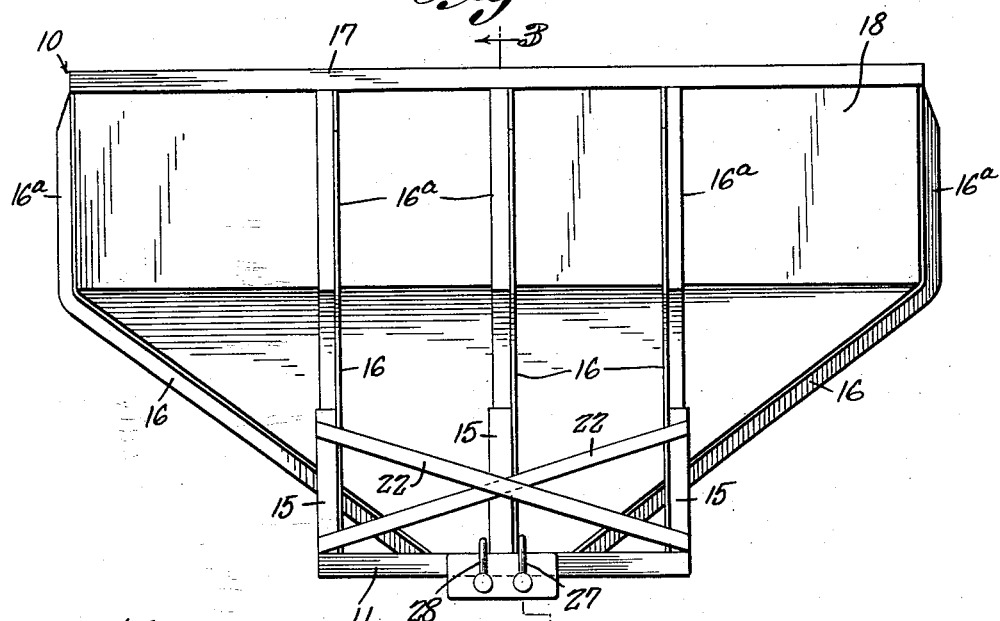
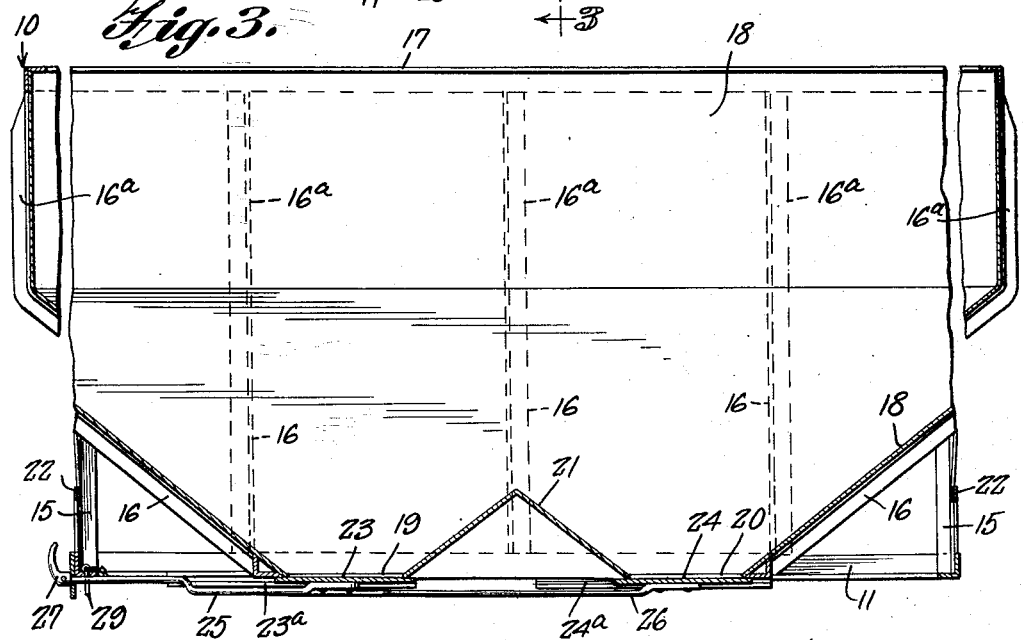
Anton Scholtz,
INVENTOR Patented May 27, 1941

2,243,395

UNITED STATES PATENT OFFICE 2,243,395

GRAIN TANK FOR TRUCKS

Anton Scholtz, Kennewick, Wash.

Application May 13, 1940, Serial No. 334,957

3 Claims. (Cl. 298—27)

This invention relates to improvements in vehicle bodies and especially is concerned with a novel open tank body useful in the hauling of grain and similar divided materials which may be stored in a hopper.

It is among the principal objects of this invention to provide a vehicle body comprising a hopper for receiving divided or particle materials such as grain and the like together with means for easily and expeditiously delivering the materials upon occasion through a conveniently accessible discharge orifice.

An important advantage of the novel vehicle body according to this invention is that the discharge orifices of the hoppers can be opened and closed as occasion may require by means of conveniently located operating members located near the end or the side of the vehicle.

Noteworthy among the features of the novel grain tank according to the present invention are its simplicity and ruggedness of construction, the former suiting the device to the requirements of manufacture under conditions of mass production and the latter assuring long useful life.

Other objects, advantages and features of the new and improved grain tank according to the present invention will be apparent to those skilled in this art during the course of the following description.

Regarded in certain of its broader aspects the novel vehicle body according to this invention comprises a braced hopper mounted on a frame suitable for attachment to longitudinal chassis elements of a vehicle and a sliding gate remotely operable for opening and closing a downwardly directed discharge orifice of said hopper.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawings,

Figure 1 is substantially a side elevational view of the presently preferred embodiment of this invention showing the same mounted as in use upon a vehicle chassis, Fig. 2 is essentially a rear elevational view of the body illustrated in Fig. 1, Fig. 3 is essentially a vertical sectional view of Fig. 2 taken along the plane indicated by the line 3—3, Fig. 4 is a horizontal sectional view of a part of the vehicle body illustrating structural details, Fig. 5 is substantially a perspective view of a fragment of one of the body braces, and Fig. 6 is substantially a top plan view of another embodiment of this invention.

Referring now especially to Figs. 1 to 5 inclusive it will be noticed that the vehicle body according to this invention generally designated by the reference character 10 comprises a lower rectangular frame 11 formed of angle iron in presenting spaced parallel side portions attachable by U-bolts 12 to longitudinal chassis elements one of which is designated by the reference character 13 of a vehicle 14.

Upright studs 15 rigidly connected to the frame 11 are attached at their top ends by appropriate means such as welding to spaced, radially, upwardly and outwardly extending angle iron braces 16 which are bent at their top end portions 16a to present essentially parallel elements substantially as shown. An upper rectangular frame 17 rigidly mounted upon the top ends of the parallel elements 16a defines a plane disposed in spaced parallelism to the plane defined by the frame 11. Sheet material 18 applied to the braces 16 and the elements 16a provides a container open at the top and having discharge openings 19 and 20 located near the bottom thereof, said discharge openings being separated by an upwardly pointing prismatic partition 21 substantially as shown. Cross pieces 22 on the end studs serve further to brace and make rigid the structure.

Gates 23 and 24 sliding in guides 23a and 24a respectively, located beneath but near the discharge openings 19 and 20 above described, serve to control discharge through the openings and, for this purpose, are slidably movable to closed or open position by means of rods 25 and 26, one end of each of said rods being attached to the gates 23 and 24 respectively and the opposite ends of said rods terminating in operating handles 27 and 28. Pins 29 and 30 receivable in openings formed in parts of the frame 11 wherein the rods 25 and 26 are slidably received serve to permit locking or at least holding of the rods in a selected position corresponding to one of the extreme sliding positions of the plates 23 and 24.

It will be evident from the foregoing description it is believed that the device is used by being mounted upon a truck or similar vehicle chassis in the manner described and that material deposited in the hopper body can be discharged through the orifices 19 and 20 controlled by the sliding plates 23 and 24 operated by the handles 27 and 28 located near the rear of the vehicle.

The embodiment of the invention illustrated in Fig. 6 is adapted to relatively larger bodies than the embodiment illustrated in the first five figures of the drawings. It will be noted that this embodiment comprises an upwardly opening hopper 35 having a plurality of discharge openings 36, 37 and 38 closed by gates 39, 40 and 41 respectively slidingly mounted in guide ways 39a, 40a and 41a respectively. The gates 39, 40 and 41 are operated by rods 42, 43 and 44 respectively, each rod being connected at one end to the corresponding gate and terminating at its opposite end in operating handles 45, 46 and 47 located near a side of the vehicle. The bracing and other structural details of this embodiment of the present invention resemble in detail the corresponding portions of the structure illustrated in the first five figures of the drawings and the operation of this embodiment will be apparent from the description of the first embodiment of the invention.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A body adapted to be attached to longitudinal chassis frame elements of a vehicle comprising a rectangular angle iron frame having side portions spaced to be received upon and attached to said elements by appropriate means such as U-bolts and the like; spaced, radiating, upwardly and outwardly extending angle bars rigidly mounted on said rectangular frame; plates on said bars providing an inverted frusto-pyramidoidal hopper, open at top and bottom; a plate for closing the hopper bottom opening; and a rod rigidly connected at one end to said plate, slidably mounted in parts of the rectangular frame, terminating at its free end in a handle for facilitating opening and closing of the hopper opening by sliding the plate to either of two extreme positions.

2. A body adapted to be attached to longitudinal chassis frame elements of a vehicle comprising a rectangular angle iron frame having side portions spaced to be received upon and attached to said elements by appropriate means such as U-bolts and the like; spaced, radiating, upwardly and outwardly extending angle bars rigidly mounted on said rectangular frame; plates on said bars providing an inverted frusto-pyramidoidal hopper, open at top and bottom; essentially parallel facing horizontal guides beneath but near the bottom opening of the hopper; a plate sliding in said guides for closing the hopper bottom opening; a rod rigidly connected at one end to said plate, slidably mounted in parts of the rectangular frame, terminating at its free end in a handle for facilitating opening and closing of the hopper opening by sliding the plate to either of two extreme positions; and means comprising a pin receivable in openings formed in the rod and frame for holding the plate in a selected extreme position.

3. A body adapted to be attached to the chassis frame of a vehicle, comprising a rectangular hopper formed of angle iron having vertical upper portions and converging lower ends and lined with metal to form a hopper with a flat base, a rectangular frame of angle iron of less area than the hopper frame and of a size approximately that of the chassis frame of a vehicle and adapted to be clamped thereto by U-bolts, upwardly extending rigid studs carried by the side and end members of the lower rectangular frame and having their upper ends rigidly attached to the converging portions of the hopper angle irons, and sliding gates closing the base of the hopper.

ANTON SCHOLTZ.